(12) United States Patent
Lucky

(10) Patent No.: US 10,709,227 B2
(45) Date of Patent: Jul. 14, 2020

(54) OBJECT MOUNTING DEVICE

(71) Applicant: Lawrence Lucky, Belton, MO (US)

(72) Inventor: Lawrence Lucky, Belton, MO (US)

( * ) Notice: Subject to any disclaimer, the term of this patent is extended or adjusted under 35 U.S.C. 154(b) by 35 days.

(21) Appl. No.: 16/193,362

(22) Filed: Nov. 16, 2018

(65) Prior Publication Data

US 2020/0154867 A1 May 21, 2020

(51) Int. Cl.
*A45F 5/00* (2006.01)
*H04R 1/02* (2006.01)
*F16B 1/00* (2006.01)
*F16B 2/08* (2006.01)

(52) U.S. Cl.
CPC .................. *A45F 5/00* (2013.01); *F16B 1/00* (2013.01); *F16B 2/08* (2013.01); *H04R 1/026* (2013.01); *A45F 2200/0508* (2013.01); *F16B 2001/0035* (2013.01)

(58) Field of Classification Search
CPC ... A45F 5/00; A45F 2200/0508; H04R 1/026; F61B 1/00; F61B 2/08; F61B 2001/0035
See application file for complete search history.

(56) References Cited

U.S. PATENT DOCUMENTS

| | | | |
|---|---|---|---|
| 7,179,032 B2* | 2/2007 | Guy | B21J 15/043 248/74.2 |
| 2012/0074284 A1 | 3/2012 | Huang | |
| 2017/0262016 A1 | 9/2017 | Janowski et al. | |
| 2018/0168336 A1 | 6/2018 | Castleberry et al. | |
| 2019/0185094 A1* | 6/2019 | Vogel | F16B 1/00 |

FOREIGN PATENT DOCUMENTS

| | | |
|---|---|---|
| DE | 202011109311 U1 | 3/2012 |
| DE | 202013008052 U1 | 2/2014 |
| GB | 2485409 A | 5/2012 |
| GB | 2546083 A | 7/2017 |
| WO | 2013129316 A1 | 9/2013 |

OTHER PUBLICATIONS

Website available at least as early as Oct. 11, 2018 at: https://www.mobilefun.com/padpivot-nst-ultra-portable-universal-tablet-stand-36174.
Website available at least as early as Oct. 18, 2018 at: https://sagework.org/Magnetic GuitarSupport.
Website available at least as early as Oct. 18, 2018 at: https://www.amazon.com/AppStrap-fits-tablets-heavy-duty-included/dp/B00DV1RFKIElectronic device holder with a thigh strap.

* cited by examiner

*Primary Examiner* — Brian Ensey
(74) *Attorney, Agent, or Firm* — PatentFile, LLC; Bradley C. Fach; Steven R. Kick

(57) ABSTRACT

An object mounting device may include a generally planar support surface that may be disposed on a base. A mounting surface may also be disposed on the base. The mounting surface may be opposingly positioned to the support surface, and the mounting surface may be configured with a curved shape that is concave curved relative to the support surface. The device may support an object, such as a portable speaker, on the support surface, while the curved shape of the mounting surface may be positioned in contact with a portion of an individual, such as on the thigh of their leg. Optionally, the device may include a support fastener configured to secure an object, such as a portable speaker, on or to the support surface. Optionally, the device may include a harness which may be configured to secure the mounting surface to a portion of an individual.

19 Claims, 10 Drawing Sheets

OBJECT MOUNTING DEVICE

FIELD OF THE INVENTION

This patent specification relates to the field of devices that are configured to mount and support objects. More specifically, this patent specification relates to devices that are configured to mount and support objects and which may be secured to portions of an individual's body.

BACKGROUND

It is common for individuals to need to support and secure objects and many devices exist for this purpose. For example, an individual, such as a guitar player, may desire to support one or more objects while allowing their hands to be free to play the guitar. Unfortunately, the existing devices are limited in the objects they are able to support and where they may be secured.

Therefore, a need exists for novel devices that are configured to mount and support objects. A further need exists for novel devices that are configured to mount and support objects and which may be secured to portions of an individual's body. There is also a need for novel devices that are configured to support one or more objects while allowing an individual's hands to remain free and unencumbered.

BRIEF SUMMARY OF THE INVENTION

An object mounting device is provided which may be configured to support and/or secure an object, such as a portable speaker, to another object or person. In some embodiments, the device may include a generally planar support surface that may be disposed on a base. A mounting surface may also be disposed on the base. The mounting surface may be opposingly positioned to the support surface, and the mounting surface may be configured with a curved shape that is concave curved relative to the support surface. Preferably, the surface may comprise a spheroid cap shape. The device may support an object, such as a portable speaker, on the support surface, while the curved shape of the mounting surface may be positioned in contact with a portion of an individual, such as on the thigh of their leg.

In further embodiments, the device may include one or more support fasteners which may be configured to secure an object, such as a portable speaker, on or to the support surface. Preferably, a support fastener may comprise a magnetic material which may be used to magnetically engage an object to the support surface.

In still further embodiments, the device may include a harness which may be configured to secure the mounting surface to a portion of an individual, such as on the thigh of their leg.

In still further embodiments, the device may include a speaker that may be coupled to a base preferably via a speaker housing. A mounting surface may be disposed on the base. The mounting surface may be opposingly positioned to the speaker, and the mounting surface may be configured with a curved shape that is concave curved relative to the support surface. Preferably, the surface may comprise a spheroid cap shape.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Figure 1:
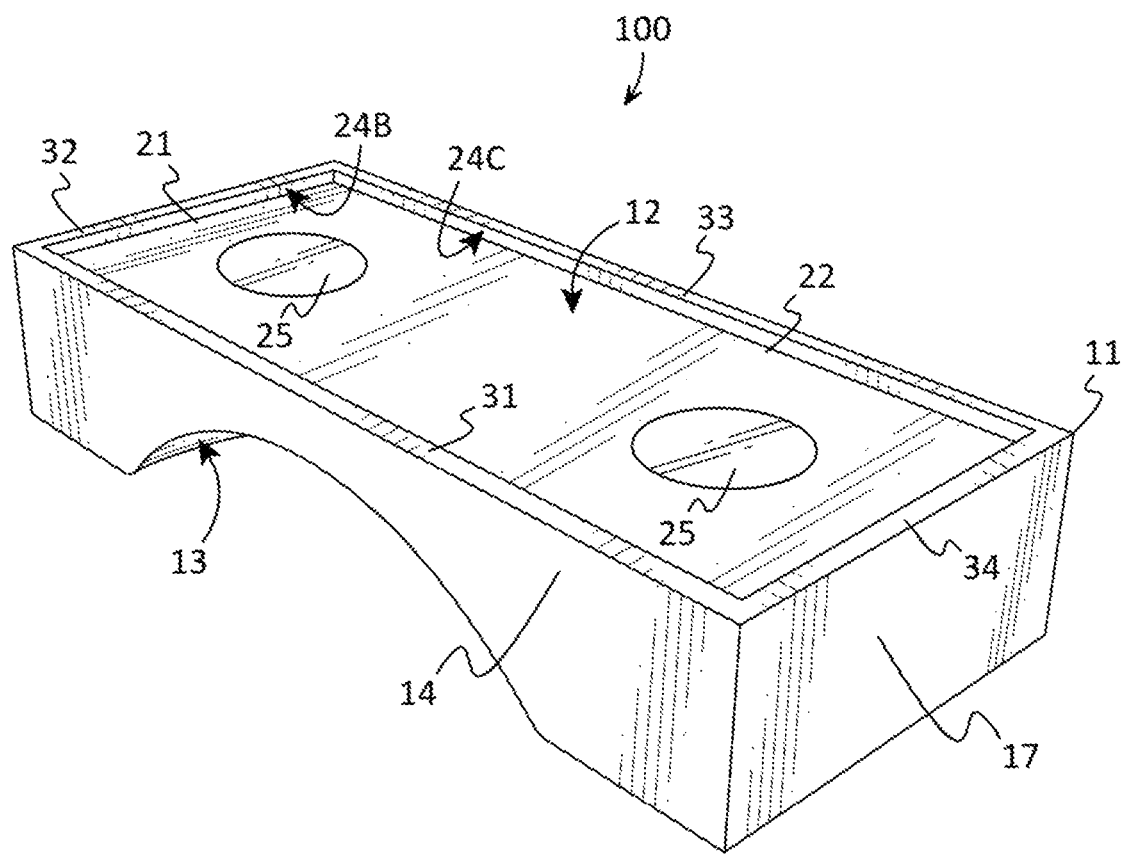
FIG. 1 depicts a front perspective view of an example of an object mounting device according to various embodiments described herein.

For purposes of description herein, the terms "upper", "lower", "left", "right", "rear", "front", "side", "vertical", "horizontal", and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Although the terms "first", "second", etc. are used herein to describe various elements, these elements should not be limited by these terms. These terms are only used to distinguish one element from another element. For example, the first element may be designated as the second element, and the second element may be likewise designated as the first element without departing from the scope of the invention.

As used in this application, the term "about" or "approximately" refers to a range of values within plus or minus 10% of the specified number. Additionally, as used in this application, the term "substantially" means that the actual value is within about 10% of the actual desired value, particularly within about 5% of the actual desired value and especially within about 1% of the actual desired value of any variable, element or limit set forth herein.

A new object mounting device is discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

The present invention will now be described by example and through referencing the appended figures representing preferred and alternative embodiments. FIGS. 1-8 and 10-13 illustrate examples of an object mounting device ("the device") 100 according to various embodiments. In some embodiments, the device 100 may comprise a generally planar support surface 12 that may be disposed on a base 11. A mounting surface 13 may also be disposed on the base 11. The mounting surface 13 may be opposingly positioned to the support surface 12, and the mounting surface 13 may comprise a curved planar shape that is concave curved relative to the support surface 12. The device 100 may support an object 200, such as a portable speaker 300, on the support surface 12, while the curved planar shape of the mounting surface 13 may be positioned in contact with a portion of an individual, such as on the thigh of their leg.

In some embodiments, the base 11 may be configured in a generally rectangular prism shape, and the base 11 may comprise a first side wall 14, a second side wall 15, a third side wall 16, a fourth side wall 17, and a base wall 18. The first side wall 14 may be opposingly positioned to the third side wall 16, and the second side wall 15 may be opposingly positioned to the fourth side wall 17. Also, the base wall 18 and the support surface 12 may be coupled to the side walls 14, 15, 16, 17, so that the base wall 18 may be opposingly positioned to the support surface 12. Optionally, the first 14 and third 16 sidewalls may be approximately parallel to each other, and the second 15 and fourth 17 sidewalls may be approximately parallel to each other.

In other embodiments, the base 11 may be configured with a generally cylindrical or elliptic cylindrical shape, and the base 11 may comprise a single first side wall 14. The base wall 18 and the support surface 12 may be coupled to the side wall 14 so that the base wall 18 may be opposingly positioned to the support surface 12. In still other embodiments, the base 11 may be configured with a generally triangular prism shape having three side walls 14, 15, 16, and the base wall 18 and the support surface 12 may be coupled to the side walls 14, 15, 16, so that the base wall 18 may be opposingly positioned to the support surface 12. In alternative embodiments, the base 11 may be configured in any shape and size by having any number of side walls that may also be configured in any shape and size. For example, one or more of the side walls 14, 15, 16, 17, may comprise a planar shape, a curved shape, or any other geometric or non-geometric shape, including combinations of shapes.

In some embodiments, the base 11 may be made from or may comprise a substantially rigid material, such as steel alloys, aluminum, aluminum alloys, copper alloys, other types of metal or metal alloys, ceramics such as alumina, porcelain, and boron carbide, earthenware, natural stone, synthetic stone, various types of hard plastics, such as polyethylene (PE), Ultra-high-molecular-weight polyethylene (UHMWPE, UHMW), polypropylene (PP) and polyvinyl chloride (PVC), polycarbonate, nylon, Poly(methyl methacrylate) (PMMA) also known as acrylic, melamine, hard rubbers, fiberglass, carbon fiber, resins, such as epoxy resin, wood, other plant based materials, or any other material including combinations of materials that are substantially rigid and able to resist deformation.

In further embodiments, the base 11 may be may be made from or comprise a flexible material such as natural and/or synthetic rubber material such as latex rubber, silicone foam, silicone rubber, rubber foam, urethane foam, plastic foam, neoprene foam, latex foam rubber, polyurethane foam rubber, forms of the organic compound isoprene, Polyacrylate Rubber, Ethylene-acrylate Rubber, Polyester Urethane, flexible plastics, such as high-density polyethylene (HDPE), polyvinyl chloride (PVC), polypropylene (PP), Polystyrene (PS), Polycarbonate (PC), low density polyethylene (LDPE), or any other flexible material including combinations of materials.

The device 100 may comprise a support surface 12 which may generally form upper portions of the device 100. In some embodiments, a support surface 12 may be disposed on the base 11 by being coupled to the base 11, by being formed into the base 11, or with any other suitable fabrication method. Any suitable material(s) may be used to form the support surface 12, such as those which may be used to form the base 11. In preferred embodiments, the support surface 12 may be rectangular in shape having a first side 19, a second side 21, a third side 22, and a fourth side 23. The first side 19 may be opposingly positioned to the third side 22, and the second side 21 may be opposingly positioned to the fourth side 22. In other embodiments, a support surface 12 may be configured in any other shape and size having one, two, three, five, six, or any number of sides 19, 21, 22, 23. In further embodiments, a support surface 12 may be generally planar or flat. In other embodiments, a support surface 12 may be curved, textured, or configured with any other surface topography. In still other embodiments, a support surface 12 may comprise a circular or oval shape, generally having a circular or oval shaped first side 19. In alternative embodiments, a support surface 12 may comprise two, three, five, six, seven, or more sides 19, 21, 22, 23, so that the support surface 12 may comprise a triangle shape, pentagon shape, hexagon shape, or any other shape and size.

Figure 2:
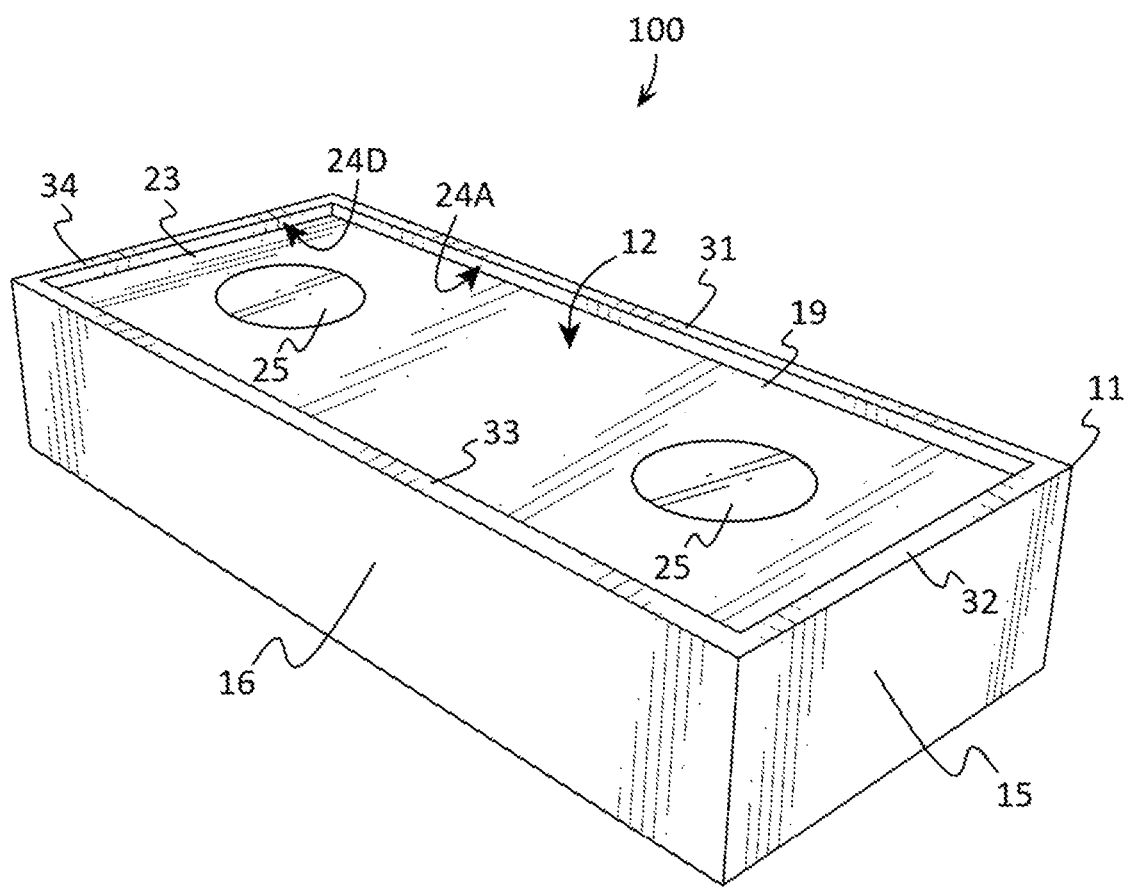
FIG. 2 illustrates a rear perspective view of an example of an object mounting device according to various embodiments described herein.
Figure 3:
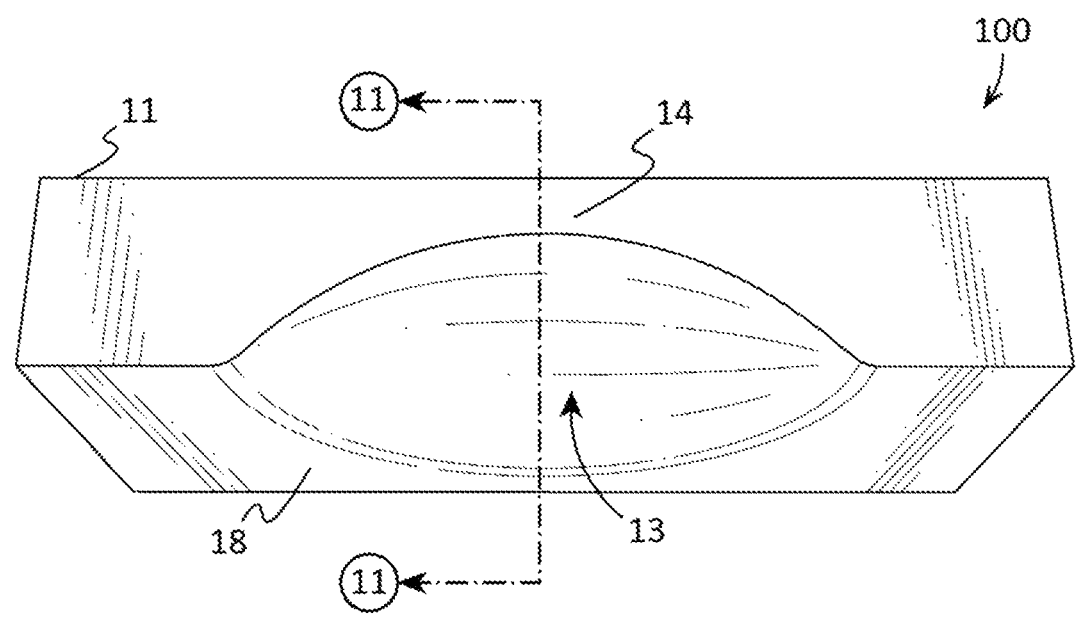
FIG. 3 shows a front bottom perspective view of an example of an object mounting device according to various embodiments described herein.
Figure 4:
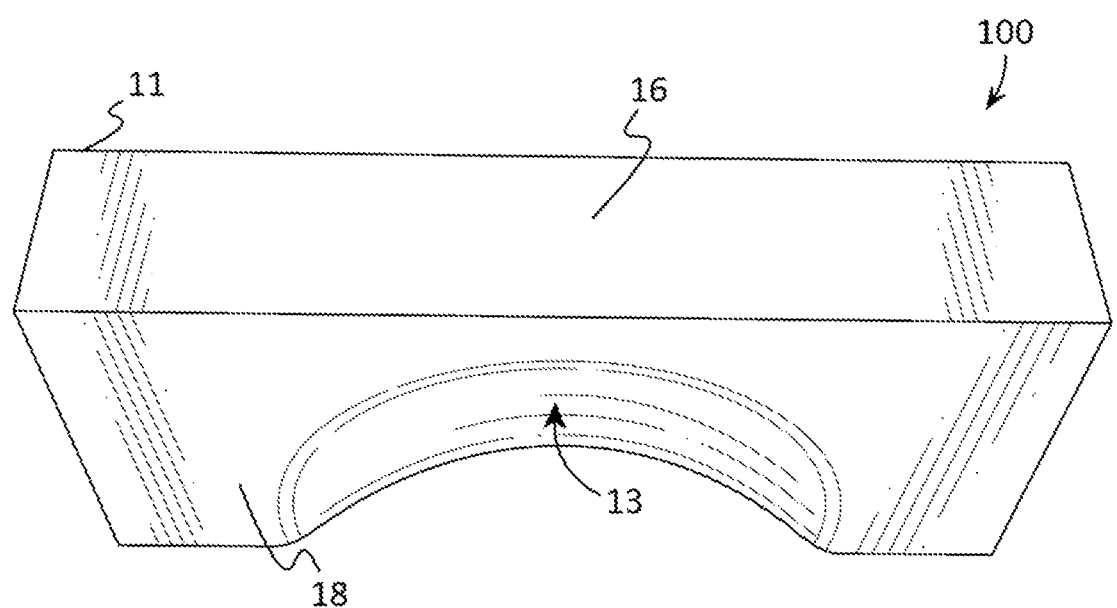
FIG. 4 depicts a rear bottom perspective view of an example of an object mounting device according to various embodiments described herein.
Figure 5:
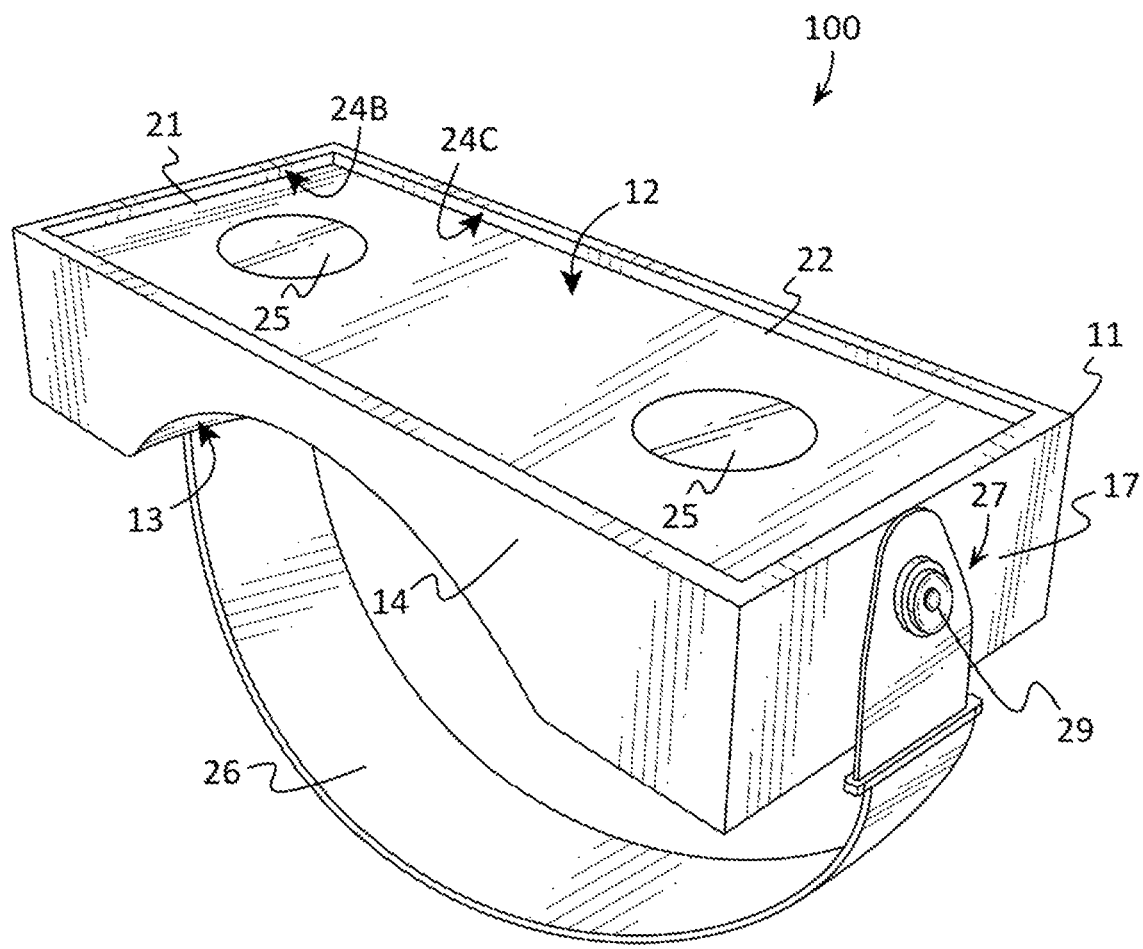
FIG. 5 illustrates a front perspective view of another example of an object mounting device according to various embodiments described herein.
Figure 6:
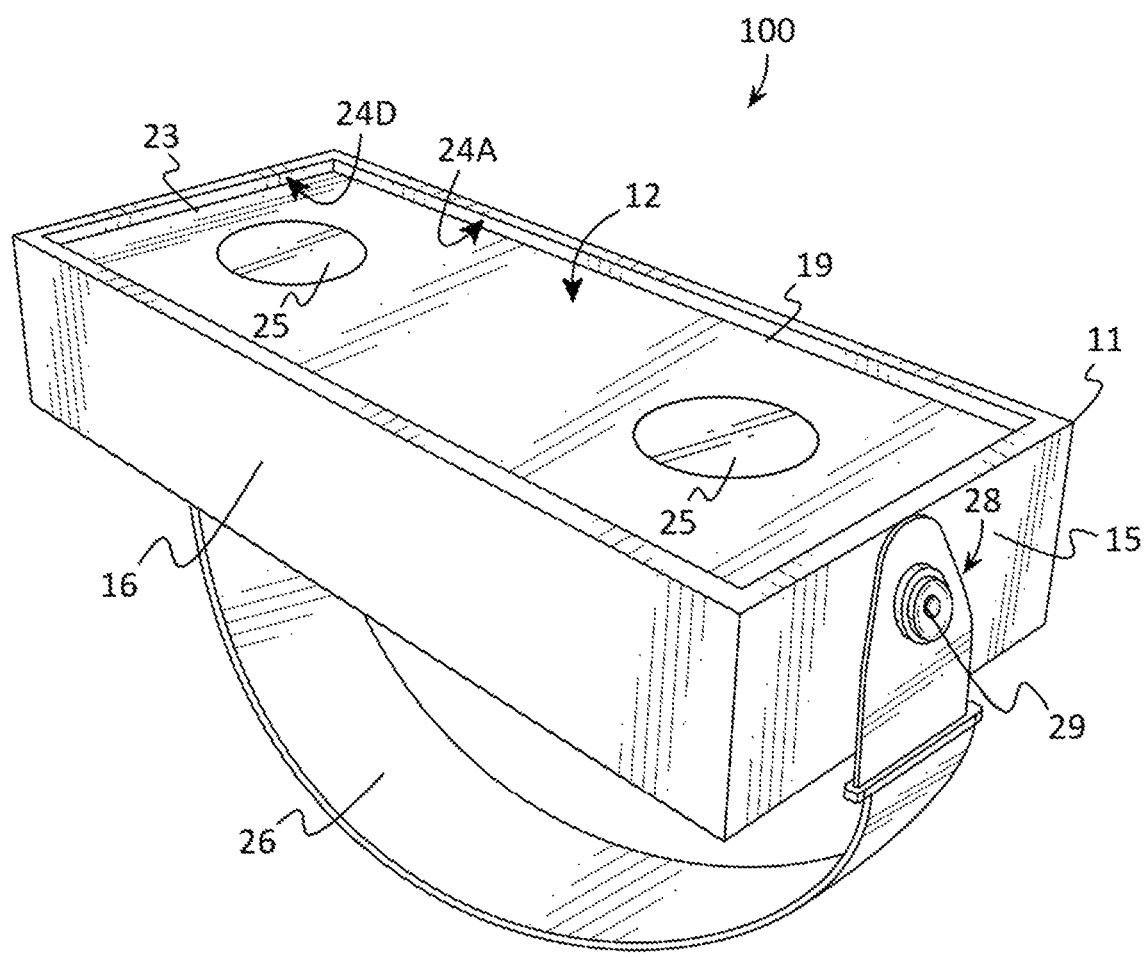
FIG. 6 shows a rear perspective view of another example of an object mounting device according to various embodiments described herein.
Figure 7:
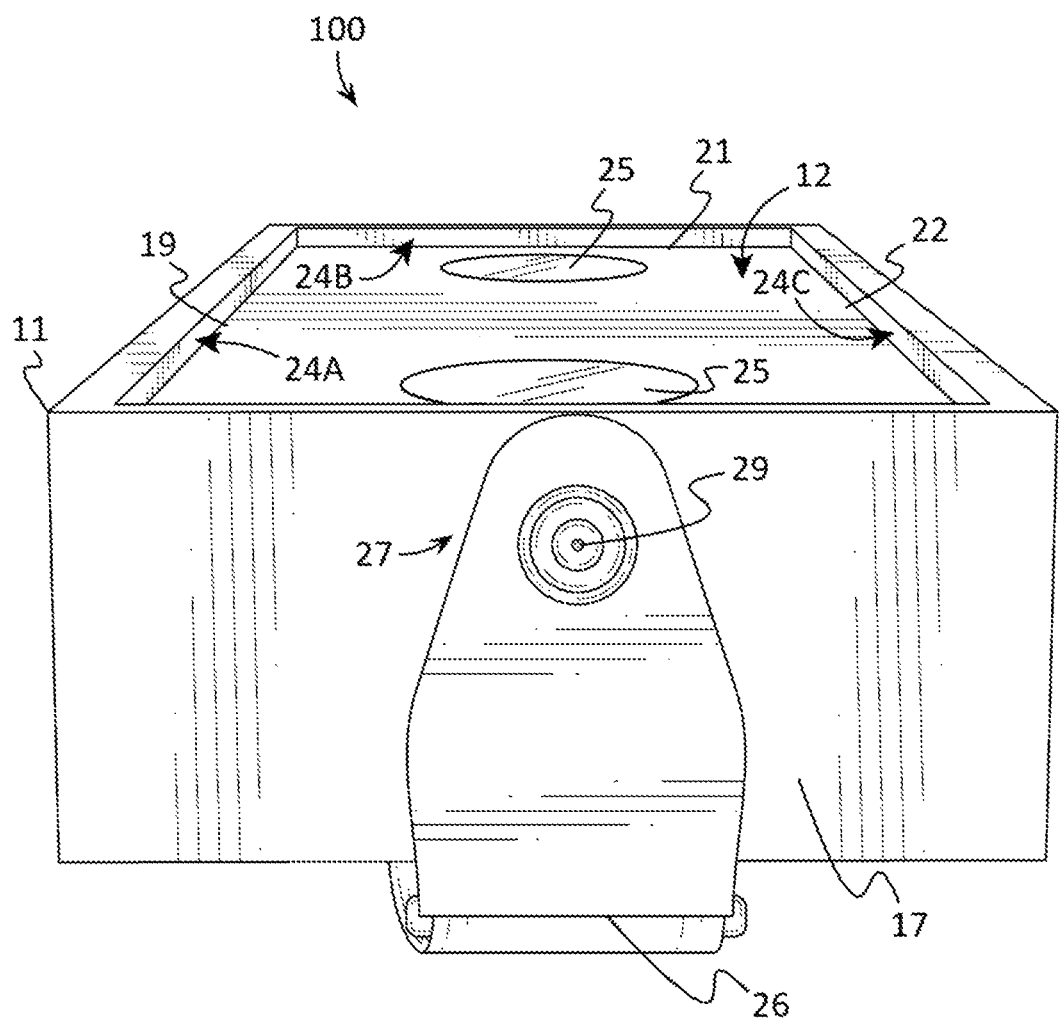
FIG. 7 depicts a side perspective view of another example of an object mounting device according to various embodiments described herein.
Figure 8:
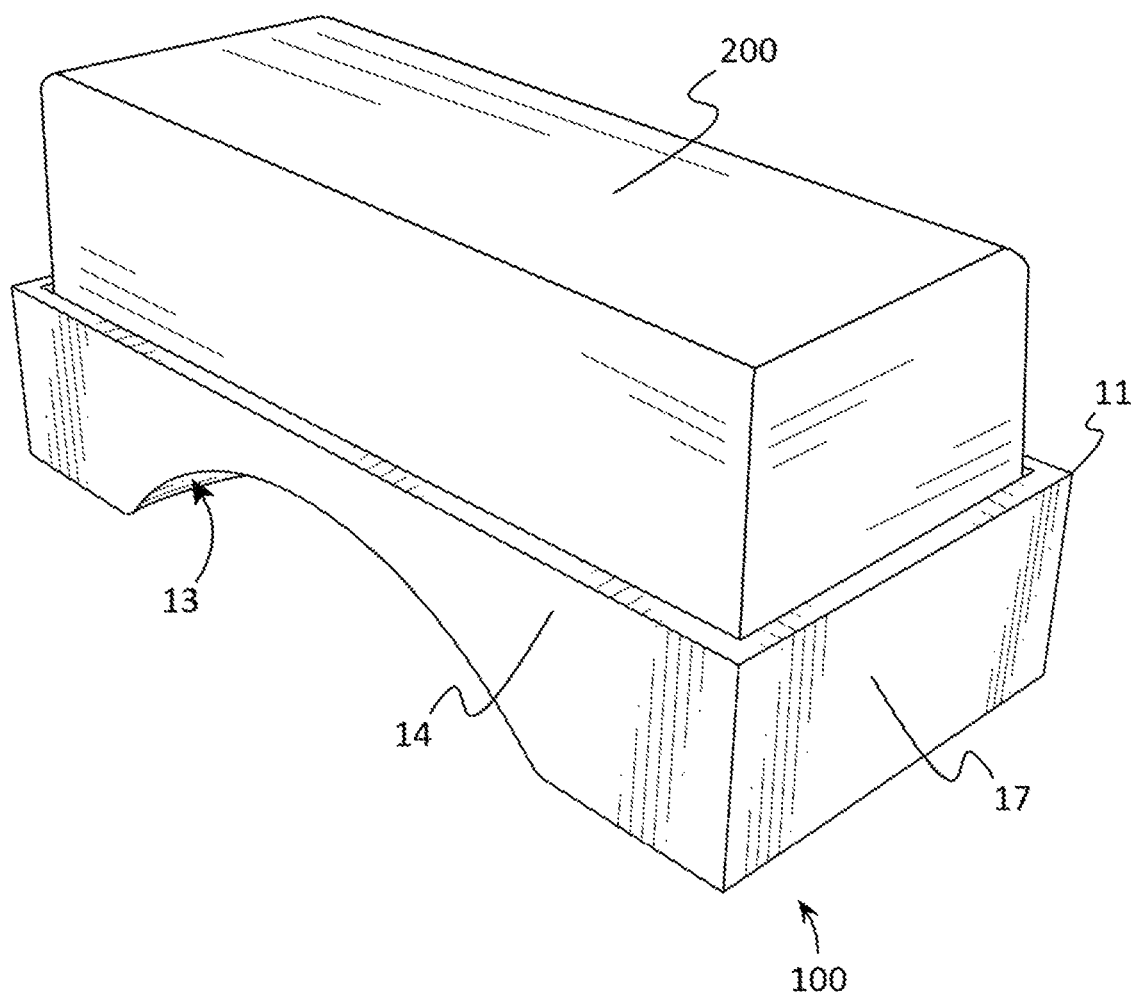
FIG. 8 illustrates a perspective view of an example of an object mounting device supporting an object according to various embodiments described herein.
Figure 9:
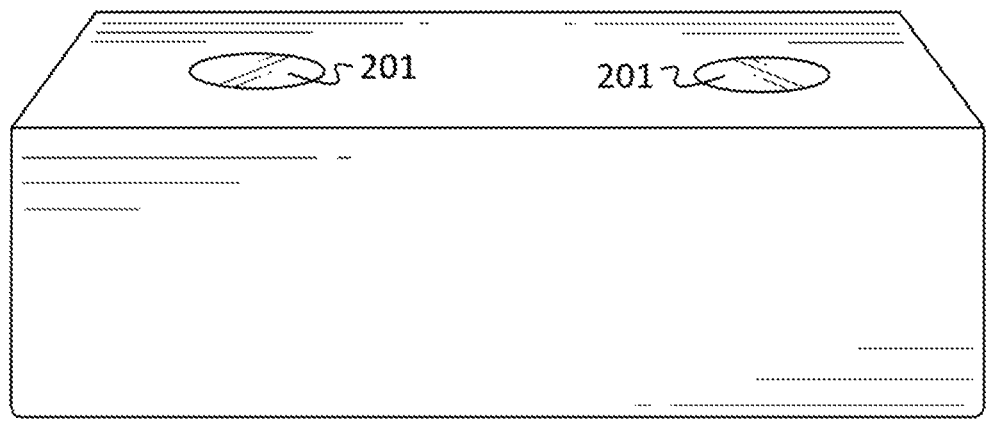
FIG. 9 shows a bottom perspective view of an example of an object, such as a portable speaker, having object fasteners which may be coupled to an object mounting device according to various embodiments described herein.
Figure 10:
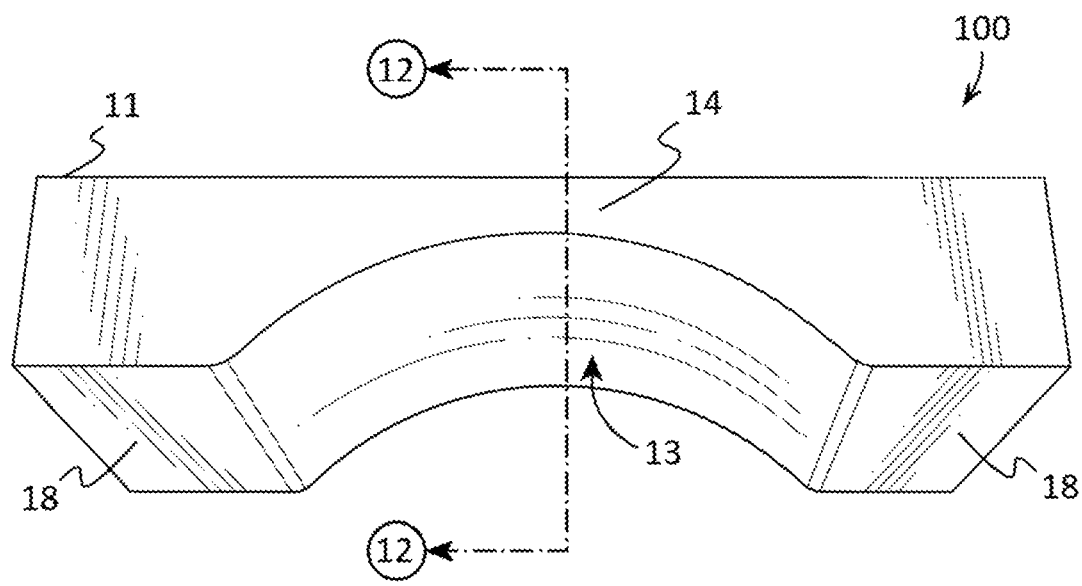
FIG. 10 depicts a bottom perspective view of still another example of an object mounting device according to various embodiments described herein.
Figure 11:
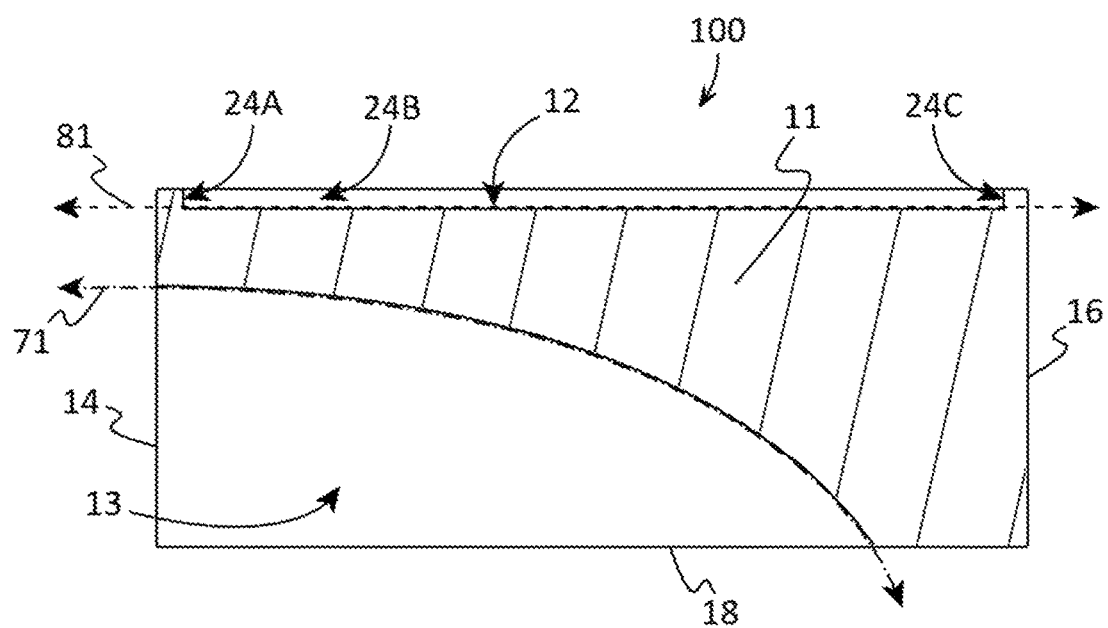
FIG. 11 illustrates a sectional, through line 11-11 shown in FIG. 3, elevation view of an example of an object mounting device according to various embodiments described herein.

The device 100 may comprise a mounting surface 13 that may be disposed on the base 11. In some embodiments, a mounting surface 13 may be disposed on the base 11 by being coupled to the base 11, by being formed into the base 11, or with any other suitable fabrication method. Any suitable material(s) may be used to form the mounting surface 13, such as those which may be used to form the base 11. A mounting surface 13 may be opposingly positioned to the support surface 12. Generally, a mounting surface 13 may be opposingly positioned to the support surface 12 by having the mounting surface 13 positioned separate from the support surface 12 so that it may not contact the support surface 12. In some embodiments, a mounting surface 13 may be opposingly positioned to the support surface 12 by having the mounting surface 13 positioned to contact or formed into portions of a base wall 18 as best shown in FIGS. 2, 3, and 10. In other embodiments, a mounting surface 13 may be opposingly positioned to the support surface 12 by having the mounting surface 13 positioned to contact or formed into portions of a base wall 18 and portions of a side wall 14, 15, 16, 17, such as the first side wall 14 as best shown in FIGS. 2, 3, and 10. In further embodiments, a mounting surface 13 may be opposingly positioned to the support surface 12 by having the mounting surface 13 positioned to contact or formed into portions of a base wall 18 and portions of only one side wall 14, 15, 16, 17, such as the first side wall 14 as best shown in FIGS. 2, 3, and 11. In still other embodiments, a mounting surface 13 may be opposingly positioned to the support surface 12 by having the mounting surface 13 positioned to contact or formed into portions of a base wall 18 and portions of two or more side walls 14, 15, 16, 17, such as the first side wall 14 and third side wall as best shown in FIG. 10.

In preferred embodiments, a mounting surface 13 may comprise a curved shape that is concave curved relative to the support surface 12. In some embodiments, a mounting surface 13 may comprise a curved planar shape may be likened to a right section of a cylinder that is open on both ends. Examples include an elliptic cylinder, parabolic cylinder or hyperbolic cylinder. In preferred embodiments, a mounting surface 13 may comprise a spheroid cap shape or curved rounded shape that is concave curved relative to the support surface 12. A spheroid cap shape may comprise a section of a sphere or other spheroid shape. A spheroid may comprise a sphere, a prolate spheroid, an oblate spheroid, or any other generally rounded three-dimensional shape. A spheroid cap is a portion of a spheroid cut off by a plane. For example, if the plane passes through the center of the sphere, so that the height of the cap is equal to the radius of the sphere, the spheroid cap is called a hemisphere.

Figure 12:
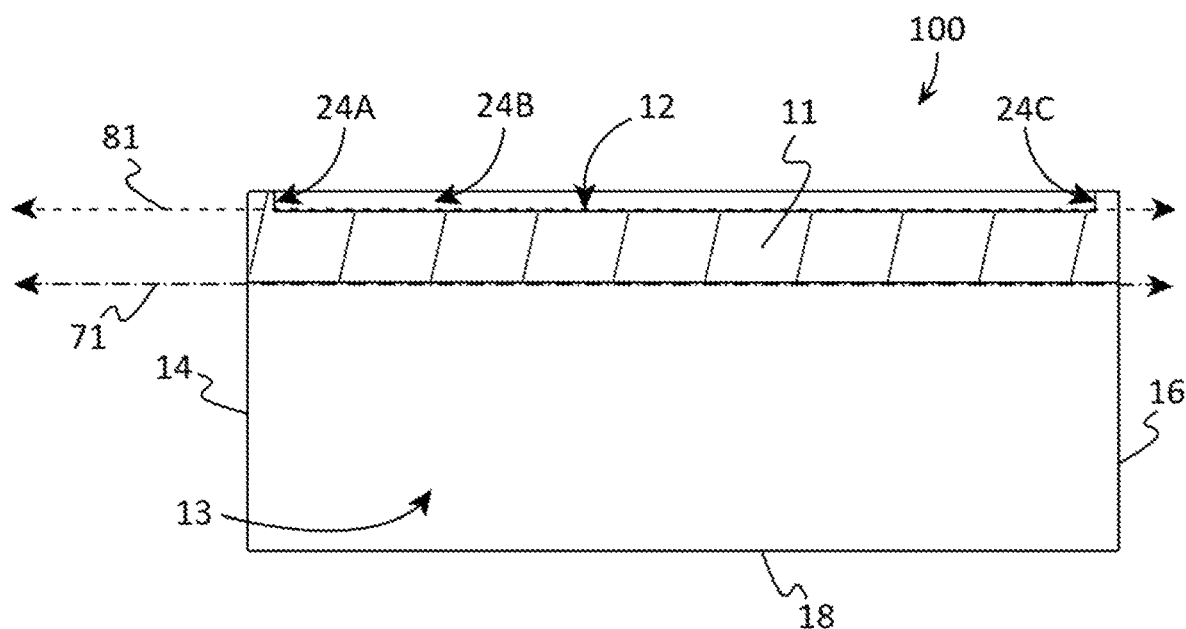
FIG. 12 shows a sectional, through line 12-12 shown in FIG. 10, elevation view of still another example of an object mounting device according to various embodiments described herein.

In further preferred embodiments, a mounting surface 13 may comprise a curved shape, and more preferably a spheroid cap shape, that is concave curved relative to the support surface 12, and the curved shape may comprise an apex 71. The apex 71 may generally form a line of symmetry for the curved shape of the mounting surface 13, and the apex 71 may extend along the apex of the curved shape, such as the apex line of a parabolic cylinder or the longest arc of a spheroid cap shape. In further preferred embodiments, the apex 71 of a spheroid cap shape may comprise an arc of the spheroid cap shape that may form the portion of the spheroid cap shape that is recessed the farthest into the base 11 as shown by FIG. 3 (in which section line 11-11 forms the apex 71) and FIG. 11. In some embodiments, the apex 71 may be approximately centrally positioned in the base 11 so that the apex 71 is approximately equidistant to two opposing side walls 14, 15, 16, 17, such as between the second 15 and fourth 17 sidewalls. In some embodiments, the support surface 12 may be generally flat or planar in shape so as to have a support surface plane 81 (FIGS. 11 and 12). In preferred embodiments, the device 100 may comprise an apex 71 which may comprise an arc shape, such as an arc of a spheroid, as shown in FIG. 11. In other embodiments, the device 100 may comprise an apex 71 which may approximately parallel to the support surface plane 81 of the support surface 12 as shown in FIG. 12.

In some embodiments, the device 100 may comprise one or more retaining surfaces 24 which may be coupled to or proximate to one or more sides 21, 22, 23, 24, of a support surface 12 and/or to one or more side walls 14, 15, 16, 17. Generally, a retaining surface 24 may be positioned above or otherwise extending above a support surface 12. Preferably, a retaining surface 24 may be coupled to the support surface 12 and extending away from the support surface 12. A retaining surface 24 may be configured in any size and shape, and a retaining surface 24 may extend along all or portions of one or more sides 21, 22, 23, 24, of a support surface 12. For example, a device 100 comprising a circular shaped support surface 12 having a circular first side 19 may comprise a circular shaped retaining surface 24 that may be coupled to or proximate to the first side 19 and extend along all or portions of the first side 19. In some embodiments, a retaining surface 24 may be generally planar in shape and may be approximately perpendicular to the support surface 12. In other embodiments, a retaining surface 24 may be generally curved in shape and extend above the support surface 12.

In further embodiments, the device 100 may comprise a rectangular shaped support surface 12 having at least two opposingly positioned sides 19, 21, 22, 23, and the device 100 may also comprise two or more retaining surfaces 24, such as a first retaining surface 24A, second retaining surface 24B, a third retaining surface 24C, and a fourth retaining surface 24D, with two retaining surfaces 24A, 24B, 24C, 24D, positioned on opposing sides of the support surface 12. For example, a first retaining surface 24A may be coupled to or positioned proximate to a first side 19 while a third retaining surface 24C may be coupled to or positioned proximate to a third side 22 in which the first side 19 and third side 22 may be opposingly positioned to each other resulting in the first retaining surface 24A and third retaining surface 24C being opposingly positioned to each other. Likewise, a second retaining surface 24B may be coupled to or positioned proximate to a second side 21 while a fourth retaining surface 24D may be coupled to or positioned proximate to a fourth side 23 in which the second side 21 and fourth side 23 may be opposingly positioned to each other resulting in the second retaining surface 24B and fourth retaining surface 24D being opposingly positioned to each other.

In some embodiments, the device 100 may comprise one or more arms (as best shown in FIGS. 1 and 2), such as a first arm 31, a second arm 32, a third arm 33, and a fourth arm 34. Generally, an arm 31, 32, 33, 34, may be coupled to the base 11 and configured to extend above the support surface 12. Preferably, a retaining surface 24A, 24B, 24C, 24D, may be coupled to or formed on an arm 31, 32, 33, 34. In further embodiments, an arm 31, 32, 33, 34, may be coupled to the base 11 be being formed into a side wall 14, 15, 16, 17. In other embodiments, an arm 31, 32, 33, 34, may be coupled to the base 11 be being coupled to a side wall 14, 15, 16, 17, and/or a side 19, 21, 22, 23, of the support surface 12.

In preferred embodiments, the device 100 may comprise one or more support fasteners 25 which may be configured to secure one or more objects 200, such as a portable speaker 300 having a speaker housing 301 and a speaker 302, to the support surface 12. In some embodiments, a support fastener 25 may be configured to couple (removably or non-removably) an object 200, such as a portable speaker 300, to the device 100, such as to the support surface 12. In other embodiments, a support fastener 25 may be configured to be coupled (removably or non-removably) to an object fastener 201 of an object 200 (such as a portable speaker 300), thereby coupling the object 200 to the device 100, such as to the support surface 12. A support fastener 25 may comprise any fastener or coupling method which may be suitable for coupling objects together. An object fastener 201 may comprise any fastener or coupling method which may be suitable for being coupled to a support fastener 25.

In some embodiments, a support fastener 25 may comprise a press fit or snap fit fastener, hook and loop type or Velcro® fasteners, threaded type fasteners, tongue and groove fasteners, clip type fasteners, clasp type fasteners, ratchet type fasteners, a push-to-lock type connection method, a turn-to-lock type connection method, a slide-to-lock type connection method or any other fastener or coupling method.

In preferred embodiments, a support fastener 25 may comprise a magnetic material which may be removably coupled to an object fastener 201 that also comprises a magnetic material thereby allowing the fasteners 25, 201, to be magnetically engaged together. In some embodiments, a magnetic material may be or may comprise a high-coercivity ferromagnetic compound type of magnetic material such as ferric oxide mixed with a plastic binder. In other embodiments, a first fastener 31 and second fastener 32 may be or comprise a magnetic material such as ferrite, manganese-zinc ferrite, nickel-zinc ferrite, strontium ferrite, cobalt ferrite, barium ferrite, magnetic alloys such as alnico, comol, Hypernom® magnetic alloy, manganese-zinc ferrite, iron-silicon magnet alloys, nickel-zinc ferrite, ferritic stainless steel alloys, strontium ferrite, barium ferrite, alnico, iron-silicon magnet alloy, Chromindur® (Chromium-Cobalt-Iron) alloys, Silmanal (Silver-Manganese-Aluminium) alloys, Platinax II (platinum-cobalt) alloy, Bismanol (manganese bismuthide) alloy, cobalt-platinum alloys, chromium-manganese antimonide alloy, vectolite (cobalt ferrite), magnadur (sintered barium ferrite), lodex (oxide-coated iron-cobalt particles), awaruite (Ni2Fe to Ni3Fe nickel-iron alloy), wairauite, rare earth magnets such as samarium-cobalt, cesium-cobalt, neodymium-iron-boron, other neodymium magnet materials, metallic oxides such as magnetite, ulvospinel, hematite, ilmenite, maghemite, jacobsite, iron sulfides such as pyrrhotite, greigite, troilite, metallic oxyhydroxides such as goethite, lepidocrocite, feroxyhyte, ferrimagnetic materials such as magnetite, pyrrhotite, cubic ferrites, hexagonal ferrites, ferromagnetic materials including metals such as iron, nickel, cobalt, metal alloys containing iron, nickel, and/or cobalt, soft magnetic materials, hard magnetic materials, or any other suitable magnetic material, that is capable of magnetically adhering to another magnetic material through the principle of magnetism.

In some embodiments, the device 100 may comprise a harness 26 which may be used to removably couple the device 100 too one or more objects or people. Preferably, a harness 26 may be configured to position and secure the mounting surface 13 in contact with a portion of an individual, such as on the thigh of their leg. A harness 26 may comprise any apparatus or device which may be used to removably couple the device 100 too one or more objects or people. In its simplest form, a harness 26 can be made from a length of flexible material, such as cord, rope, nylon webbing, leather strap, or the like, which may be positioned around the body of a user. In some embodiments, a harness 26 may comprise a first end 27 and a second end 28 which may be coupled to the base 11, optionally via one or more harness fasteners 29. A harness fastener 29 may comprise any type of fastener, such as a snap fastener, rivet, and threaded fastener, or coupling method, such as adhesive and heat bonding. In preferred embodiments, a harness 26 may be coupled to two opposingly positioned side walls 14, 15, 16, 17. For example, a first end 27 may be coupled to a second side wall 15 and a second end 28 may be coupled to a fourth side wall 17. Optionally, the length of the harness 26 may be adjustable and comprise one or more adjustable fasteners, such as buckles, carabiners, clamps, clips, hook-and-loop type fasteners, or any other suitable fastener.

Figure 13:
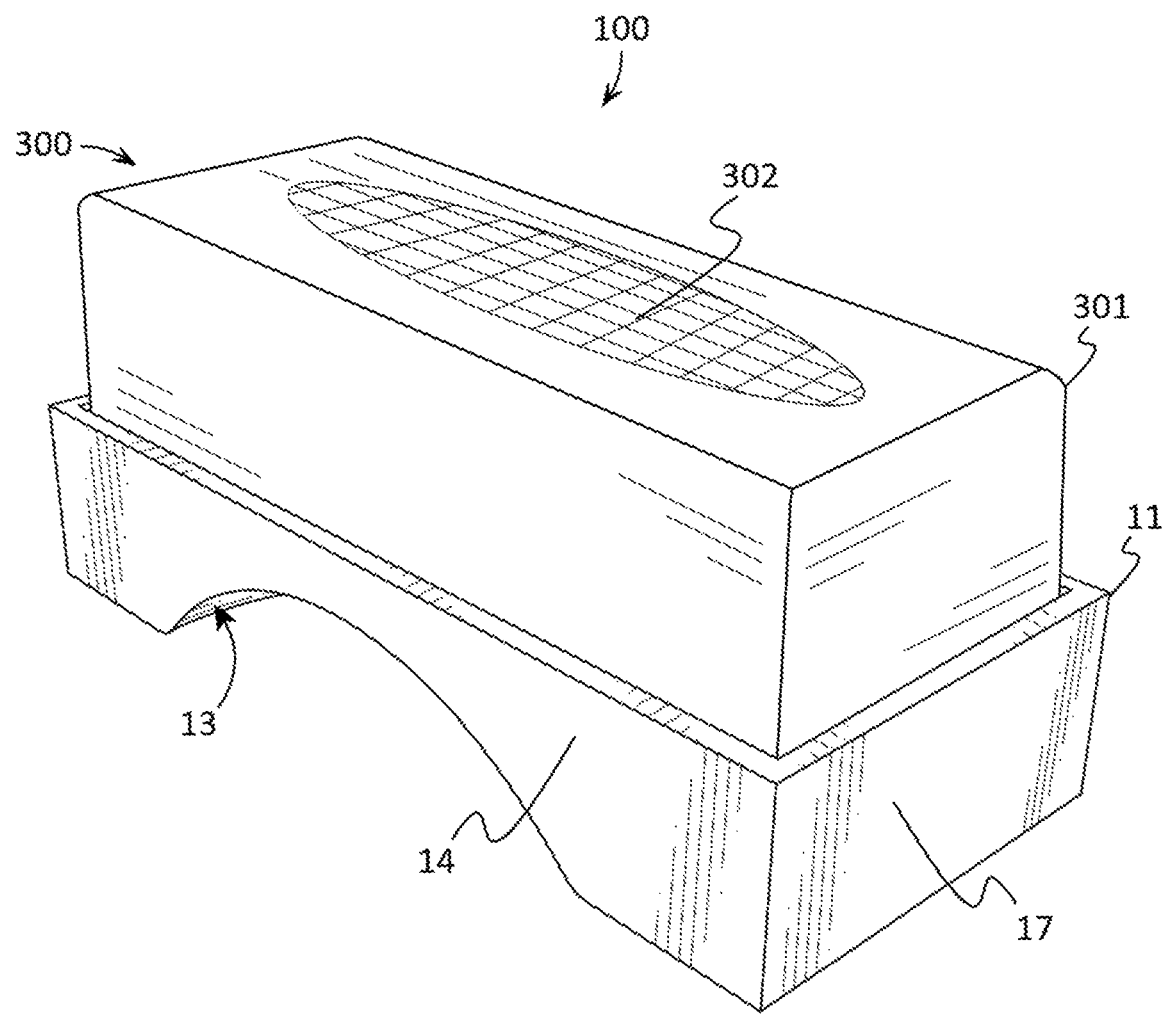
FIG. 13 depicts a perspective view of an example of an object mounting device comprising a speaker housing and a speaker according to various embodiments described herein.

FIG. 13 depicts a perspective view of an example of an object mounting device 100 comprising a speaker housing 301 and a speaker 302 which may be configured as a portable speaker 300 according to various embodiments described herein. In some embodiments, the device 100 may have a base 11 comprising one or more side walls 14, 15, 16, 17, and a base wall 18. A speaker housing 301 may be coupled to the base 11, and the speaking housing 301 may comprise a speaker 302. A mounting surface 13 may be disposed on the base 11, and the mounting surface 13 may be opposingly positioned to the speaker housing 301. The mounting surface 13 may comprise a curved shape, and more preferably a spheroid cap shape, that may be concave curved relative to the speaker housing 301, and the mounting surface 13 may be formed into the base wall and into one or more of the walls 14, 15, 16, 17.

A speaker housing 301 may comprise any shape and size, such as a generally rectangular prism shape, which may be used to surround all or portions of a speaker 302. A speaker 302 may be coupled to the speaker housing 301 and the speaker housing 301 may be coupled to the base 11, thereby coupling the speaker 302 to the base 11. A speaker 302 may comprise an electrical apparatus which may be used to produce a plurality of sounds at a plurality of volume levels. A speaker 302 may comprise a buzzer, a piezoelectric sound producing device, a dielectric elastomer sound producing device, a buzzer, a moving coil loudspeaker, an electrostatic loudspeaker, an isodynamic loudspeaker, a piezo-electric loudspeaker, or any other device capable of producing one or more sounds. In preferred embodiments, a speaker 302 may be configured to be in wired and/or wireless communication with a guitar, other instrument, smartphone, tablet computer, or other electronic device, so that the guitar, other instrument, smartphone, tablet computer, or other electronic device may cause the speaker 302 to output desired sounds and music.

While some exemplary shapes and sizes have been provided for elements of the device 100, it should be understood to one of ordinary skill in the art that the base 11, support surface 12, mounting surface 13, side walls 14, 15, 16, 17, harness 26, and any other element described herein may be configured in a plurality of sizes and shapes including "T" shaped, "X" shaped, square shaped, rectangular shaped, cylinder shaped, cuboid shaped, hexagonal prism shaped, triangular prism shaped, or any other geometric or non-geometric shape, including combinations of shapes. It is not intended herein to mention all the possible alternatives, equivalent forms or ramifications of the invention. It is understood that the terms and proposed shapes used herein are merely descriptive, rather than limiting, and that various changes, such as to size and shape, may be made without departing from the spirit or scope of the invention.

Additionally, while some materials have been provided, in other embodiments, the elements that comprise the device 100 may be made from or may comprise durable materials such as aluminum, steel, other metals and metal alloys, wood, hard rubbers, hard plastics, fiber reinforced plastics, carbon fiber, fiber glass, resins, polymers or any other suitable materials including combinations of materials. Additionally, one or more elements may be made from or may comprise durable and slightly flexible materials such as soft plastics, silicone, soft rubbers, or any other suitable materials including combinations of materials. In some embodiments, one or more of the elements that comprise the device 100 may be coupled or connected together with heat bonding, chemical bonding, adhesives, clasp type fasteners, clip type fasteners, rivet type fasteners, threaded type fasteners, other types of fasteners, or any other suitable joining method. In other embodiments, one or more of the elements that comprise the device 100 may be coupled or removably connected by being press fit or snap fit together, by one or more fasteners such as hook and loop type or Velcro® fasteners, magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, a slide-to-lock type connection method or any other suitable temporary connection method as one reasonably skilled in the art could envision to serve the same function. In further embodiments, one or more of the elements that comprise the device 100 may be coupled by being one of connected to and integrally formed with another element of the device 100.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. An object mounting device, the device comprising:
   a base;
   a planar support surface disposed on the base;
   a mounting surface disposed on the base, the mounting surface opposingly positioned to the support surface, and the mounting surface comprising a curved shape that is concave curved relative to the support surface; and
   wherein the base comprises a first side wall and a base wall, and wherein the mounting surface is formed into the base wall and the first side wall.

2. The device of claim 1, further comprising a retaining surface.

3. The device of claim 1, wherein the support surface is rectangular in shape having a first side, a second side, a third side, and a fourth side, wherein the first side is opposingly positioned to the third side, and wherein the second side is opposingly positioned to the fourth side.

4. The device of claim 3, further comprising a first retaining surface and a second retaining surface, wherein the first retaining surface is positioned on the first side, and wherein the second retaining surface is positioned on the third side.

5. The device of claim 1, further comprising a support fastener.

6. The device of claim 5, wherein the support fastener comprises a magnetic material.

7. The device of claim 1, further comprising a harness.

8. The device of claim 1, wherein the mounting surface comprises a spheroid cap shape.

9. The device of claim 1, wherein the base comprises a first side wall, a second side wall, a third side wall, and a fourth side wall, wherein the first side wall is opposingly positioned to the third side wall, and wherein the second side wall is opposingly positioned to the fourth side wall.

10. The device of claim 9, further comprising a harness that is coupled to two opposingly positioned side walls.

11. The device of claim 9, wherein the curved shape of the mounting surface is formed into the base wall and a single side wall selected from the group consisting of the first side wall, second side wall, third side wall, and fourth side wall.

12. The device of claim 9, wherein the curved shape comprises an apex, and wherein the apex is substantially equidistant between two opposingly positioned side walls.

13. An object mounting device, the device comprising:
    a base comprising a first side wall, a base wall, and a support fastener;
    a planar support surface disposed on the base;
    a support fastener;
    a mounting surface disposed on the base, the mounting surface opposingly positioned to the support surface, and the mounting surface comprising a spheroid cap shape that is concave curved relative to the support surface, wherein the mounting surface is formed into the base wall and the first side wall.

14. The device of claim 13, further comprising a retaining surface.

15. The device of claim 13, wherein the support surface is rectangular in shape having a first side, a second side, a third side, and a fourth side, wherein the first side is opposingly positioned to the third side, and wherein the second side is opposingly positioned to the fourth side.

16. The device of claim 15, further comprising a first retaining surface and a second retaining surface, wherein the first retaining surface is positioned on the first side, and wherein the second retaining surface is positioned on the third side.

17. The device of claim 13, wherein the support fastener comprises a magnetic material.

18. The device of claim 13, further comprising a harness.

19. An object mounting device, the device comprising:
    a base;

a planar support surface disposed on the base;
a mounting surface disposed on the base, the mounting surface opposingly positioned to the support surface, and the mounting surface comprising a curved shape that is concave curved relative to the support surface;
wherein the base comprises a first side wall, a second side wall, a third side wall, and a fourth side wall, the first side wall opposingly positioned to the third side wall and the second side wall opposingly positioned to the fourth side wall; and
wherein the curved shape of the mounting surface is formed into the base wall and a single side wall selected from the group consisting of; the first side wall, the second side wall, the third side wall, and the fourth side wall.

\* \* \* \* \*